US007981516B2

(12) United States Patent
Labrousse et al.

(10) Patent No.: US 7,981,516 B2
(45) Date of Patent: Jul. 19, 2011

(54) TRANSPARENT SUBSTRATE WHICH IS COVERED WITH A STACK OF THIN LAYERS HAVING REFLECTION PROPERTIES IN INFRARED AND/OR SOLAR RADIATION

(75) Inventors: Laurent Labrousse, La Courneuve (FR); Nicolas Nadaud, Gentilly (FR); Eric Petit Jean, Las Lilas (FR)

(73) Assignee: Saint-Gobain Glass France, Courbevoie (FR)

( * ) Notice: Subject to any disclaimer, the term of this patent is extended or adjusted under 35 U.S.C. 154(b) by 648 days.

(21) Appl. No.: 10/568,390

(22) PCT Filed: Aug. 19, 2004

(86) PCT No.: PCT/FR2004/002164

§ 371 (c)(1),
(2), (4) Date: Oct. 13, 2006

(87) PCT Pub. No.: WO2005/019126

PCT Pub. Date: Mar. 3, 2005

(65) Prior Publication Data

US 2007/0104965 A1 May 10, 2007

(30) Foreign Application Priority Data

Aug. 20, 2003 (FR) ..................................... 03 10045

(51) Int. Cl.
*B32B 17/06* (2006.01)
*B32B 15/04* (2006.01)

(52) U.S. Cl. ........ 428/432; 428/469; 428/428; 428/433; 428/448; 428/450; 428/472; 428/336; 428/689; 428/698; 428/699; 428/701; 428/702; 428/913

(58) Field of Classification Search ........................ None
See application file for complete search history.

(56) References Cited

U.S. PATENT DOCUMENTS

| | | | | |
|---|---|---|---|---|
| 4,749,397 | A | 6/1988 | Chesworth et al. | |
| 5,942,338 | A | 8/1999 | Arbab et al. | |
| 2005/0123772 | A1* | 6/2005 | Coustet et al. | 428/432 |

FOREIGN PATENT DOCUMENTS

| | | | |
|---|---|---|---|
| WO | WO-02/48065 | * | 6/2002 |

OTHER PUBLICATIONS

U.S. Appl. No. 10/576,724, filed Apr. 21, 2006, Labrousse, et al.
U.S. Appl. No. 10/577,049, filed Apr. 24, 2006, Labrousse, et al.

* cited by examiner

*Primary Examiner* — Ling Xu
(74) *Attorney, Agent, or Firm* — Oblon, Spivak, McClelland, Maier & Neustadt, L.L.P.

(57) ABSTRACT

The invention relates to a transparent substrate provided with a thin-film multilayer comprising at least one functional metal layer, especially a silver-based layer, having reflection properties in the infrared and/or in the solar radiation range, at least one metal barrier layer in contact with the functional layer and at least one upper dielectric layer, characterized in that at least one barrier layer is based on zirconium and in that the upper dielectric layer comprises at least one ZnO-based layer in contact with the functional layer or with the barrier layer.

15 Claims, No Drawings

TRANSPARENT SUBSTRATE WHICH IS COVERED WITH A STACK OF THIN LAYERS HAVING REFLECTION PROPERTIES IN INFRARED AND/OR SOLAR RADIATION

CROSS-REFERENCE TO RELATED APPLICATIONS

This application is a 371 of PCT/FR04/02164 filed Aug. 19, 2004 and claims the benefit of FR 0310045 filed Aug. 20, 2003.

The present invention relates to a transparent substrate provided with a thin-film multilayer comprising at least one functional metal layer, especially a silver-based layer, having reflection properties in the infrared and/or in the solar radiation range, at least one metal barrier layer in contact with the functional layer and at least one upper dielectric layer.

Such substrates are already known in which the layers constituting the multilayer create an optical interference system that results in selective transmission of certain parts of the solar spectrum or infrared radiation.

It is known that silver deposited as a functional layer on a substrate is relatively sensitive to chemical stresses, especially to attack by oxygen, and it is liable to be degraded during the subsequent deposition of another layer, especially when this is oxide-based. To protect the silver layers from being attacked by oxygen, they are therefore, as a general rule, protected by a thin metal layer applied on top of them, this layer being called a “barrier layer” that has a very high affinity for oxygen.

Similarly, it may be opportune to have beneath the silver layer a metal barrier layer so as to protect the silver layer from an oxygen flux coming from the lower part of the multilayer.

This type of multilayer is described for example in document FR-A-2 641 271, which relates to a substrate intended to be incorporated into a glazing unit, bearing a coating composed of a tin oxide, titanium oxide, aluminum oxide and/or bismuth oxide sublayer, then a zinc oxide layer with a thickness not greater than 15 nm, then a silver layer, a transparent covering layer comprising a layer of an oxide of a sacrificial metal, chosen from Ti, Al, stainless steel, Bi, Sn and mixtures thereof, and at least one other Sn, Ti, Al and/or Bi oxide layer, the oxide of sacrificial metal being formed by initial deposition of the sacrificial metal, with a thickness of 2 to 15 nm, followed by its conversion into an oxide so as to produce the barrier layer.

This structure helps to improve the corrosion resistance of the silver layer, not only during manufacture of the coated substrate but also during the lifetime of the product.

In practice, only titanium and stainless steel are given as illustrations of sacrificial metal, with a thickness of at least 3.5 nm.

Nickel-chromium is also a metal quite often used to form a barrier layer in a silver-based multilayer. However, the optical performance of such multilayers is limited in terms of light transmission and their energy performance which could be further improved.

In a multilayer known from document EP 104 870, which relates to the production of a low-emissivity coating by sputtering, one or more of an additional metal, other than silver, are sputtered onto a silver layer, in an amount equivalent to a layer from 0.5 to 10 nm in thickness, before carrying out reactive sputtering, in the presence of oxygen or of an oxidizing gas, onto the silver and the additional metal, of one or more antireflection metal oxide layers under conditions which, in the absence of the additional metal or metals, would lead to substantial reductions in the low-emissivity properties of the resulting product.

Copper is presented as an advantageous additional metal because of its oxidation resistance and of its contribution to the low emissivity, but other metals are also envisioned that oxidize following the reactive sputtering process into a colorless oxide favorable to a high light transmission. Among such metals, aluminum, titanium and zirconium are mentioned. Other preferred metals are Bi, In, Pb, Mn, Fe, Cr, Ni, Co, Mo, W, Pt, Au, Vd, Ta and alloys such as stainless steel and brass. Various metal oxides are then combined to produce a superior antireflection coating.

Example 19 reveals in particular the possibility of using zirconium as additional metal, with a thickness of 2.7 nm, on a 10 nm thick silver layer, in combination with two $SnO_2$ oxide coatings with a thickness of 48 nm underneath and 43 nm on top, respectively.

Among the examples presented, this structure makes it possible to achieve an advantageous light transmission of 84%.

However, the Applicant has found that the mechanical integrity of such a multilayer is mediocre and that it does not sufficiently withstand the operations and handling that are needed for incorporating the substrate into a glazing unit, so that its properties, especially its emissivity and light transmission, are of course impaired thereby.

The object of the invention is to propose a substrate provided with a thin-film multilayer of the aforementioned type that exhibits high performance in terms of light transmission, external reflection color and emissivity, while still exhibiting good mechanical resistance.

The substrate according to the invention is provided with a thin-film multilayer comprising at least one functional layer, especially a silver-based layer, having reflection properties in the infrared and/or in the solar radiation range, at least one metal barrier layer in contact with the functional layer and at least one upper dielectric layer, and is characterized in that at least one barrier layer is based on Zr and in that the upper dielectric layer comprises at least one ZnO-based layer in contact with the functional layer or with the barrier layer.

Within the meaning of the present application, the terms “lower” and “upper” define the relative position of a layer relative to the functional layer, without there necessarily being any contact between said layer and the functional layer.

Also within the meaning of the present application, the term “metal barrier” is understood to mean a barrier that is deposited in metal form; however, it is obvious that this layer can undergo partial oxidation during deposition (during its own deposition, but above all during deposition of the next layer) or during a heat treatment.

It has thus been demonstrated that zirconium metal exhibits a kind of incompatibility with most dielectrics commonly used to form multilayers that include functional metal layers. The nature of this incompatibility has not been clearly identified, and could prejudice interlaminar adhesion between the layers. The scratch resistance or abrasion resistance of a multilayer combining zirconium with zinc oxide is in fact satisfactory, whereas the other multilayers have unacceptable drawbacks.

The invention applies to multilayers comprising at least one metal functional layer, especially based on silver, gold or copper, optionally doped with at least one additional metal, such as titanium or palladium in the case of silver.

According to the invention, the zirconium-based barrier layer may be placed beneath and/or on top of the functional metal layer. The ZnO-based dielectric layer may be in direct contact with a Zr-based upper barrier, or in direct contact with the functional layer or with any upper barrier if a zirconium lower barrier layer is present.

The structure according to the invention may thus be based on the sequence:

functional metal layer/Zr/ZnO etc.

where the ZnO layer is in direct contact with the zirconium.

In this case, the high mechanical stability of the multilayer is attributed to the good adhesion of the zinc oxide deposited as a thin film on the zirconium layer, whereas the other known oxides adhere poorly to Zr, probably because of poor wetting of the oxide on the zirconium during deposition of the thin film.

The multilayer may then comprise beneath the silver, a lower barrier layer based on a metal chosen from titanium, nickel-chromium, niobium, zirconium, etc.

The structure according to the invention may also be based on the sequence:

Zr/functional metal layer/ZnO etc.

In this case, the high mechanical stability of the multilayer is due to the fact that, since zirconium is used as under-barrier, it is not exposed to an oxidizing plasma, since no oxide is deposited on top, and consequently it is very little oxidized by the layer deposited beforehand.

An upper barrier may optionally be inserted between the functional metal layer and the zinc oxide, and this may be chosen from nickel-chromium, titanium, niobium and zirconium.

A structure according to the invention may be followed by another structure according to the invention, this being identical or different in one and the same multilayer.

Thanks to the structure according to the invention of the strictly lower and/or upper layers deposited on the functional layer, not only is a multilayer obtained that has very satisfactory light transmission, external reflection color and emissivity values, but also a multilayer exhibiting surprisingly good mechanical resistance and also, where appropriate, chemical resistance.

The thickness of the barrier layer(s), especially that (those) based on Zr, is advantageously chosen to be of sufficient value for the layer to oxidize only partially or practically completely—without impairing the silver layer—during the subsequent deposition of oxide or during a heat treatment in an oxidizing atmosphere, such as a toughening treatment. Preferably, this thickness is less than or equal to 6 nm, advantageously at least 0.2 nm, especially between 0.4 and 6 nm, and in particular 0.6 to 2 nm.

According to the invention, a Zr-based barrier layer is preferably deposited by magnetron sputtering using a zirconium metal target, which may optionally contain an additional element such as Ca, Y, or Hf, in a proportion of 1 to 10% by weight of the target.

The or each functional metal layer is typically a silver layer, but the invention applies in the same way to other reflective metal layers, such as silver alloys, especially containing titanium or palladium, or layers based on gold or copper. The thickness of each functional layer is especially from 5 to 18 nm, preferably around 6 to 15 nm.

The substrate according to the invention may comprise one or more functional metal layers, especially two or three, each with a thickness within the aforementioned ranges. At least one functional layer is associated with a zirconium-based barrier layer and preferably each functional metal layer is associated with a zirconium-based barrier layer. The position of the zirconium-based layer with respect to a functional metal layer is not necessarily the same as for the other functional metal layer or layers within a multilayer.

The function of the zinc oxide upper dielectric layer is especially to protect the subjacent functional metal layer, while contributing to the optical properties of the substrate.

This layer may in general be deposited with a thickness of at least 5 nm, especially around 5 to 25 nm, and more particularly 5 to 10 nm.

The multilayer may also include a lower dielectric layer based on an oxide or nitride, especially comprising the sequence $SnO_2/TiO_2/ZnO$ or the sequence $Si_3N_4/ZnO$.

The multilayer may also include an upper mechanical protection layer whose function is to improve the mechanical resistance of the multilayer, especially its resistance to scratching or abrasion.

This may be an optionally doped layer based on an oxide, nitride and/or oxynitride, especially based on at least one oxide of titanium, zinc, tin, antimony, silicon or mixtures thereof, optionally nitrided, or based on a nitride, especially based on silicon nitride or aluminum nitride. Mention may more particularly be made of $TiO_2$, $SnO_2$, and $Si_3N_4$, or mixed oxides based on zinc and tin ($ZnSnO_x$), optionally doped with another element such as Sb, or based on zinc and titanium ($ZnTiO_x$) or else based on zinc and zirconium ($ZnZrO_x$).

It may also be a combination of layers based on the above-mentioned materials, especially $Si_3N_4/SnZnO_x$ or $Si_3N_4/TiO_2$.

Among these compounds, silicon nitride has an additional advantage when the substrate is intended to undergo an oxidizing heat treatment. This is because it blocks the diffusion of oxygen into the interior of the multilayer, including at high temperature. Since the nitride is largely inert with respect to an oxidizing attack, it undergoes no appreciable chemical (oxidative) or structural modification during a heat treatment of the toughening type. It therefore causes practically no optical modification of the multilayer in the case of heat treatment, especially in terms of light transmission level. This layer may also act as barrier to the diffusion of species migrating from the glass, especially alkaline metals. Furthermore, thanks to its refractive index close to 2, it is readily received in a multilayer of the low-emissivity type from the standpoint of adjusting the optical properties.

This protection layer may generally be deposited with a thickness of at least 10 nm, for example between 15 and 50 nm, especially around 25 to 45 nm.

Preferably, the multilayer according to the invention substantially preserves its properties, especially optical properties, after a heat treatment at a temperature of at least 500° C., whether this be for example a toughening operation, annealing operating or bending operation.

The present invention also relates to low-emissivity or solar-protection glazing that incorporates at least one substrate as described above and especially laminated glazing or double glazing.

This is because the coated substrate may be used as double glazing, the multilayer being able to be affixed to the insert film within the laminated assembly facing the outside (face 2) or facing the inside (face 3). In such glazing, at least one substrate may be toughened or hardened, especially that bearing the multilayer. The coated substrate may also be joined to another glass, at least via a gas-filled cavity in order to form an insulating multiple glazing unit (double glazing). In this case, the multilayer preferably faces the intermediate gas-filled cavity (face 2 and/or face 3). A double glazing unit according to the invention may incorporate at least one laminated glass.

When the glazing according to the invention is mounted as double glazing with another substrate, the assembly advantageously has a light transmission of between 40 and 90%.

Furthermore, the glazing according to the invention advantageously has a selectivity defined by the ratio of the light transmission to the solar factor, $T_L$/SF of between 1.1 and 2.1.

The present invention also relates to a method of improving the mechanical strength of a transparent substrate, especially glass, provided with a thin-film multilayer comprising at least one functional metal layer, especially a silver-based layer, having reflection properties in the infrared and/or in the solar radiation range, at least one metal barrier layer in contact with the functional layer and at least one upper dielectric layer, characterized in that at least one functional metal layer, a Zr-based lower and/or upper barrier layer, respectively on and/or under said functional metal layer, and a ZnO-based upper dielectric layer are deposited on the substrate by sputtering.

The invention is illustrated hereinafter by comparative examples and examples according to the invention, in which various barriers and dielectric layers will be examined.

Unless otherwise indicated, the thicknesses of the substrates and of the glazing of the comparative examples are identical to the thicknesses of the substrates and of the glazing of the examples according to the invention with which they are compared.

The following optical properties are evaluated: light transmission, light reflection on the multilayer side and color in reflection in the L*a*b* system.

The light transmission and light reflection were measured with an integrating-sphere measurement apparatus that measured the light flux in all directions on one side of the substrate or on the other.

The thermal properties were measured by means of the electrical surface resistance and the emissivity.

The mechanical resistance properties were also evaluated:

- shear abrasion resistance of the multilayer, obtained in the Erichsen scrubbing brush test. It will be recalled that in this test the multilayer is scrubbed by a brush with bristles made of polymeric material, the multilayer being covered with water;
- scratch resistance in the Erichsen stylus test. It will be recalled that in the test a stylus loaded with a weight is moved over the substrate at a given speed. The load (in newtons) needed to make the stylus visibly scratch the multilayer is noted; and
- indentation resistance in the Taber test. It will be recalled in the Taber test that the specimen is subjected to abrasive rollers for a given time and the proportion (in %) of the surface of the multilayer system that is not torn after 20 revolutions under a load of 250 g is measured.

COMPARATIVE EXAMPLE 1

In this comparative example, a silver-based multilayer according to the prior art, with a nickel-chromium barrier and a tin oxide upper dielectric layer, was deposited on a glass substrate 4 mm in thickness. A multilayer of the following type was obtained:

substrate/$SnO_2$/$TiO_2$/ZnO/Ag/NiCr/$SnO_2$.

This substrate was produced by sputtering, by making the substrate run through a chamber past metal targets in an argon atmosphere, in order to deposit a metal layer, and in an argon/oxygen atmosphere in order to deposit an oxide.

The results of the optical and energy measurements are given in Table 1 below.

The substrate was mounted in a double glazing arrangement having an intermediate cavity 15 mm in thickness filled with 90° argon, with a second glazed element 4 mm in thickness, and the transmission, the light reflection, the color in reflection, the solar factor and the coefficient U were again measured.

The results are given in Table 2 below.

The results of the mechanical measurements are given in Table 3 below.

COMPARATIVE EXAMPLE 2

In this comparative example, a multilayer substantially identical to that of Comparative Example 1 was used. Comparative Example 2 differs solely by the fact that the nickel-chromium barrier is replaced with zirconium. A stack of the following type was obtained:

substrate/$SnO_2$/$TiO_2$/ZnO/Ag/Zr/$SnO_2$.

The results of the optical measurements are given in Table 1 in monolithic format, in Table 2 in double glazing format, and results of the mechanical measurements are given in Table 3 below.

TABLE 1

| | | | | | Reflection (multilayer side) | | | |
|---|---|---|---|---|---|---|---|---|
| Ex. | Barrier type | | | $T_L$ | $R_L$ | L* | a* | b* |
| Comp. 1 | NiCr | 4.5 | 4.8 | 86.2 | 4.4 | 25.0 | 4.0 | −9.9 |
| Comp. 2 | Zr | 3.8 | 3.8 | 88.3 | 4.8 | 26.2 | 3.4 | −8.3 |

TABLE 2

| | Barrier | | External reflection | | | | | U |
|---|---|---|---|---|---|---|---|---|
| Ex. | type | $T_L$ | $R_L$ | L* | a* | b* | SF (CEN) | $(W \cdot m^{-2} \cdot K^{-1})$ |
| Comp. 1 | NiCr | 77.5 | 11.6 | 40.6 | 0.9 | −4.9 | 62 | 1.19 |
| Comp. 2 | Zr | 79.5 | 12.0 | 41.2 | 0.7 | −4.4 | 61 | 1.15 |

This shows that replacing the NiCr barrier with a Zr barrier improves the color in reflection on the multilayer side (more neutral color), increases the transmission and reduces the resistance per square in monolithic format.

This results in double glazing that is also slightly more neutral in external reflection, with a higher transmission and with better thermal insulation characteristics in double glazing format ($U=1.19\ W \cdot m^{-2} \cdot K^{-1}$ in the case of the NiCr barrier, compared with $U=1.15\ W \cdot m^{-2} \cdot K^{-1}$ in the case of the Zr barrier).

TABLE 3

| Example | Nature of the barrier | Erichsen brush | Erichsen stylus Load for scratching | Taber Amount (%) of multilayer remaining |
|---|---|---|---|---|
| Comp. 1 | NiCr | Multilayer very scarcely degraded | 2 N | 53 |
| Comp. 2 | Zr | Multilayer highly degraded | 1 N | 80 |

By replacing the NiCr barrier with Zr in the multilayer, the mechanical integrity of the multilayers in the Erichsen scrubbing brush test with a Zr barrier was catastrophic—after the test severe delamination of the multilayer was observed.

The scratch resistance was also reduced.

Only the resistance to the Taber test was improved, indicating special behavior as regards indentation compared with abrasion.

EXAMPLE 1

In this example, on a glass substrate of the same type as for Comparative Example 1, a multilayer of the following type was deposited:

substrate/$SnO_2$/$TiO_2$/ZnO/Ag/Zr/ZnO/$SnO_2$ 22 nm/8 nm/8 nm/10 nm/0.6 nm/21 nm/22 nm The results of the optical measurements are given in Table 4 in monolithic format, in Table 5 in double glazing format, and the results of the mechanical measurements are given in Table 6 below.

EXAMPLE 2

This example differs from Example 1 only by the fact that the final layer of $SnO_2$ is replaced with $Si_3N_4$. A stack of the following type was obtained:

substrate/$SnO_2$/$TiO_2$/ZnO/Ag/Zr/ZnO/$Si_3N_4$ 22 nm/8 nm/8 nm/10 nm/0.6 nm/21 nm/22 nm

COMPARATIVE EXAMPLES 1a and 2a

These comparative examples are similar to Comparative Examples 1 and 2 in which the thickness of the multilayers was adapted so as to be identical to the thicknesses of the homologous multilayers of Example 1.

In practice, the thicknesses were as follows:

Comp. Ex. 1a substrate/$SnO_2$/$TiO_2$/ZnO/Ag/NiCr/$SnO_2$ 22 nm/8 nm/8 nm/10 nm/0.6 nm/43 nm.

Comp. Ex. 2a substrate/$SnO_2$/$TiO_2$/ZnO/Ag/Zr/$SnO_2$ 22 nm/8 nm/8 nm/10 nm/0.6 nm/43 nm.

The results of the optical measurements are given in Table 4 in monolithic format and in Table 5 in double glazing format, and the results of the mechanical measurements are given in Table 6 below.

TABLE 4

| Ex. | Barrier/ Overlayer(s) | R□ (Ω/□) | $\epsilon_n$ (%) | $T_L$ | Reflection (multilayer side) $R_L$ | L* | a* | b* |
|---|---|---|---|---|---|---|---|---|
| Comp 1a | NiCr/$SnO_2$ | 5.3 | 5.8 | 84.8 | 4.1 | 24.0 | 3.2 | −5.5 |
| Comp 2a | Zr/$SnO_2$ | 4.6 | 5.0 | 88.5 | 4.6 | 25.5 | −0.2 | −6.7 |
| 1 | Zr/ZnO/$SnO_2$ | 4.8 | 5.3 | 86.8 | 4.3 | 24.7 | 1.6 | −7.1 |
| 2 | Zr/ZnO/$Si_3N_4$ | 4.9 | 5.4 | 86.3 | 4.5 | 25.2 | 1.5 | −8.3 |

TABLE 5

| Ex. | Barrier/ Overlayer(s) | $T_L$ | External reflection $R_L$ | L* | a* | b* | SF (CEN) | U ($W \cdot m^{-2} \cdot K^{-1}$) |
|---|---|---|---|---|---|---|---|---|
| Comp 1a | NiCr/$SnO_2$ | 76.2 | 11.4 | 40.2 | 0.5 | −2.7 | 62 | 1.22 |
| Comp 2a | Zr/$SnO_2$ | 79.5 | 11.8 | 40.9 | −0.9 | −3.3 | 63 | 1.19 |
| 1 | Zr/ZnO/$SnO_2$ | 78.0 | 11.6 | 40.5 | −0.3 | −3.5 | 62 | 1.20 |
| 2 | Zr/ZnO/$Si_3N_4$ | 77.5 | 11.7 | 40.7 | −0.2 | −4.1 | 63 | 1.21 |

Comparative Examples 1a and 2a also show that replacing the NiCr barrier with a Zr barrier results in an increase in the light transmission and a reduction in the emissivity in monolithic format. In double glazing format, the light transmission also increases and the factor U is lower for the same silver thickness when the barrier is of zirconium in preference to NiCr.

The levels achieved by Examples 1 and 2 demonstrate a better light transmission than with an NiCr barrier and a more neutral color in reflection.

TABLE 6

| Example | Nature of the multilayer | Erichsen brush | Erichsen stylus Load for scratching | Taber Amount (%) of multilayer remaining |
|---|---|---|---|---|
| Comp. 1a | $NiCr/SnO_2$ | Multilayer very barely degraded | 1.5 N | 53 |
| Comp. 2a | $Zr/SnO_2$ | Multilayer very barely degraded | 1 N | 80 |
| 1 | $Zr/ZnO/SnO_2$ | Multilayer very barely degraded | 2 N | 79 |
| 2 | $Zr/ZnO/Si_3N_4$ | Multilayer very barely degraded | 3 N | 88 |

Example 1 shows that the insertion of a ZnO layer between the Zr layer and the $SnO_2$ layer very slightly improves the behavior in the Taber test, but most particularly it makes the behavior in the Erichsen test similar to that of a multilayer with an NiCr barrier.

This result is surprising since in the Erichsen brush test the multilayer of Comparative Example 2 with a $Zr/SnO_2$ sequence exhibited very poor adhesion.

From Example 2, it should be noted that the behavior of the multilayers with a final $Si_3N_4$ layer is even better than that of multilayers with an $SnO_2$ final layer, with a better resistance to the Erichsen stylus test and to the Taber test.

The behavior of the multilayers according to the invention in the HCl and HH tests at high humidity (40° C., 90% humidity, for 5 days) was quite similar, or even slightly better, than that already obtained with the multilayers having an NiCr-based barrier.

EXAMPLE 3

This example has a multilayer comprising two silver layers with zirconium lower barrier layers, of the type:

$Si_3N_4/ZnO/Zr/Ag/ZnO/Si_3N_4/ZnO/Zr/Ag/ZnO/Si_3N_4$
22/10/0.5/8.2/10/69/10/0.5/10/10/28 nm.

The multilayer was deposited on a substrate consisting of a glass sheet 1.6 mm in thickness.

The mechanical properties of the multilayer were measured by means of a Taber test and by a peel test in which an adhesive tape was applied to the multilayer, the tape was pulled off and the integrity of the multilayer was assessed. The results of the mechanical measurements are given in Table 7 below.

This substrate was subjected to a heat treatment of the bending type, at above 640° C. for 6 minutes, followed by air cooling, and the optical changes after the heat treatment were determined. The substrate had the same optical quality after the heat treatment.

This substrate was joined to a glass sheet 2.1 mm in thickness in a laminated glazing unit using a PVB insert film 0.76 mm in thickness, the multilayer facing toward the inside of the laminate.

The optical properties of the multilayer were measured as previously, and the results of the optical measurements are given in Table 8 below.

COMPARATIVE EXAMPLE 3a

This comparative example is similar to Example 3 in which the zirconium barrier layers were replaced with nickel-chromium layers. A multilayer of the following type was obtained:

$Si_3N_4/ZnO/NiCr/Ag/ZnO/Si_3N_4/ZnO/Zr/Ag/ZnO/Si_3N_4$
22/10/0.7/8.2/10/69/10/0.7/10/10/28 nm.

This substrate was subjected to the same heat treatment as in Example 3: after the heat treatment, the substrate became hazy and pitting was observed.

The results of the optical and mechanical measurements are given in Tables 7 and 8.

TABLE 7

| Example | Barrier | Peel | Taber Amount (%) of multilayer remaining |
|---|---|---|---|
| Comp. 3 | NiCr | Multilayer intact | 67 |
| 3 | Zr | Multilayer intact | 70 |

TABLE 8

| | | | Reflection (multilayer side) | | | | | Thermal with- |
|---|---|---|---|---|---|---|---|---|
| Ex. | Barrier | $T_L$ | $R_E$ | $R_L$ | L* | a* | b* | stand |
| Comp 3 | NiCr | 74.2 | 30.1 | 11.4 | 41. 5 | −2.9 | −4.1 | Poor: haze, pitting |
| 3 | Zr | 76.1 | 30.0 | 10.9 | | −4.0 | −2.0 | Good: no optical change |

The invention claimed is:

1. A transparent substrate provided with a thin-film multilayer comprising at least one functional silver layer, having reflection properties in the infrared and/or in the solar radiation range, one metal barrier layer based on zirconium in contact with the functional layer and at least one upper dielectric layer, wherein the barrier layer is from 0.6 to less than 2 nm, and wherein the barrier layer based on zirconium is situated beneath or above the functional silver layer such that:

the barrier layer based on zirconium is situated above and in contact with the functional silver layer and the upper dielectric layer comprises at least one ZnO-based layer is situated above and in contact with the barrier layer; or the barrier layer based on zirconium is situated beneath and in contact with the functional silver layer and the upper dielectric layer comprises at least one ZnO-based layer is situated above and in contact with the functional silver layer or an upper barrier layer based on nickel-chromium, titanium, or niobium, wherein said multilayer substantially retains its properties, after a heat treatment at a temperature of at least 500° C.

2. The substrate as claimed in claim 1, further comprising an upper mechanical protection layer based on an oxide, nitride and/or oxynitride, this upper layer being optionally doped.

3. The substrate as claimed in claim 1, wherein the thickness of said functional silver layer is from 5 to 18 nm.

4. The substrate as claimed in claim 1, wherein the thickness of said upper dielectric layer is at least 5 nm.

5. The substrate as claimed in claim 1, wherein the Zr-based barrier layer is deposited by magnetron sputtering using a zirconium metal target that may optionally contain from 1 to 10% by weight of an additional element.

6. The substrate as claimed in claim 1, wherein the multilayer includes a lower dielectric layer based on an oxide or nitride.

7. The substrate as claimed in claim 6, wherein the lower dielectric layer comprises the sequence $SnO_2/TiO_2/ZnO$.

8. The substrate as claimed in claim 6, wherein the lower dielectric layer comprises the sequence $Si_3N_4/ZnO$.

9. A glazing comprising at least one substrate as claimed in claim 1 and an insert film.

10. A glazing assembly, which comprises at least one substrate according to claim 1 and an inert film, wherein the glazing is mounted with another substrate as double glazing and the glazing assembly has a light transmission of between 40 and 90%.

11. The glazing as claimed in claim 9, which has a selectivity defined by the ratio of the light transmission to the solar factor, $T_L$/SF of between 1.1 and 2.1.

12. The substrate as claimed in claim 1, wherein the barrier layer based on zirconium is situated above and in contact with the functional silver layer and the upper dielectric layer comprises at least one ZnO-based layer is situated above and in contact with the barrier layer.

13. The substrate as claimed in claim 1, wherein the barrier layer based on zirconium is situated beneath and in contact with the functional silver layer and the upper dielectric layer comprises at least one ZnO-based layer is situated above and in contact with the functional silver layer or an upper barrier layer based on nickel-chromium, titanium, or niobium.

14. The substrate as claimed in claim 1, wherein the barrier layer based on zirconium is situated beneath and in contact with the functional silver layer and the upper dielectric layer comprises at least one ZnO-based layer is situated above and in contact with the functional silver layer.

15. The substrate as claimed in claim 1, wherein the barrier layer based on zirconium is situated beneath and in contact with the functional silver layer and the upper dielectric layer comprises at least one ZnO-based layer is situated above and in contact with the functional silver layer or an upper barrier layer based on nickel-chromium, titanium, or niobium.

* * * * *